United States Patent Office 2,904,531
Patented Sept. 15, 1959

2,904,531
PROCESS FOR CURING POLYEPOXIDES AND RESULTING PRODUCTS

Pieter Bruin and Hendricus A. Oosterhof, Amsterdam, Netherlands, assignors to Shell Development Company, New York, N.Y., a corporation of Delaware No Drawing. Application May 13, 1957
Serial No. 658,487

Claims priority, application Netherlands May 17, 1956

9 Claims. (Cl. 260—47)

This invention relates to a process for curing polyepoxides. More particularly, the invention relates to a new process for curing polyepoxides using a special class of polyhydric phenols, and to the resulting cured products.

Specifically, the invention provides a new process for curing and resinifying polyepoxides, and preferably glycidyl polyethers of polyhydric phenols and polyhydric alcohols, which comprises heating the polyepoxide with a polyalkylhydroxy-phenylchroman derivative containing at least three phenolic hydroxyl groups per molecule, in the presence of a catalyst for the chroman-polyepoxide reaction, such as, for example, an amine.

Polyepoxides, such as those obtained by reacting epichlorohydrin with dihydric phenols, can be cured with agents, such as amines, acids or anhydrides, to form products having good adhesion and good chemical resistance. Products having these properties should be of value in the preparation of laminates and molded articles and attempts have been made in the past to utilize the polyepoxides in these applications. The results obtained heretofore, however, have not been entirely satisfactory. The polyepoxides cured with the known curing agents, for example, have not shown the hardness and strength at elevated temperatures and the resistance to powerful solvents needed for many of these applications.

It is an object of the invention, therefore, to provide a new method for curing polyepoxides. It is a further object to provide a method for curing polyepoxides using a new class of curing agents. It is a further object to provide a new method for curing polyepoxides which gives products having improved hardness and good flexibility. It is a further object to provide a method for curing polyepoxides that gives products having improved heat resistance. It is a further object to provide a method for curing polyepoxides that gives products having excellent resistance to solvents. Other objects and advantages of the invention will be apparent from the following detailed description thereof.

It has now been discovered that these and other objects may be accomplished by the process of the invention which comprises heating the polyepoxide and with a polyalkylhydroxy-phenylchroman derivative which contains at least three phenolic hydroxyl groups per molecule, in the presence of a catalyst for the phenol-polyepoxide reaction, such as, for example, an amine. It has been found that these special chroman derivatives have unexpected properties as curing agents in that they cure the polyepoxide to give insoluble infusible products which are very hard, tough and have good solvent resistance and good heat resistance.

The new curing agents comprise the polyalkylhydroxyphenylchroman derivatives containing at least three phenolic hydroxyl groups. Preferred members of this group are those of the general formula

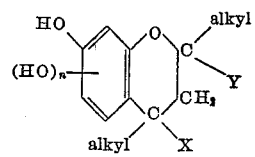

in which X and Y are dissimilar and either an alkyl group or a

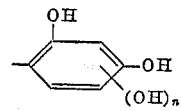

group and in which $n$ is 1 or 0. The alkyl groups are preferably methyl groups. These chroman derivatives may or may not contain other substituents, such as alkyl groups.

Examples of the above chroman derivatives include, among others, 2,4,4-trimethyl-7,2′,4′-trihydroxyflavan, 2,4,4-trimethyl-5,7,2′,4′,6′-pentahydroxyflavan, 2,4-diethyl-4-methyl-7,2′,4′-trihydroxyflavan and 2,4,4-trimethyl-6,7,2′,4′,5′-pentahydroxyflavan.

These new chroman derivatives may be prepared by reacting a polyhydric phenol with a ketone in the presence of a strong acid such as by a method described in U.S. 2,418,459. To obtain the products in crystalline form, however, certain conditions should be employed. Thus, one must use at least 50 parts of water per 100 parts of polyhydric phenol and preferably from 80 to 120 parts. Secondly, the temperature used in the reaction should not exceed 70° C. and should preferably be between 50 and 60° C. Thirdly, the acid catalyst should be a strong inorganic acid and should not be used in excess of 20% by weight of the phenol and preferably in amounts of 2 to 15% by weight of phenol. The ketone and polyhydric phenol are preferably employed in mol ratios of 1:1 to 2:1. A more detailed description of the preparation of the new chroman derivatives may be found in copending application Bruin et al., Serial No. 659,462, filed May 16, 1957.

The preparation of one of the new chroman derivatives is illustrated by the following:

PREPARATION OF 2,4,4-TRIMETHYL-7,2′,4′-TRIHYDROXYFLAVAN 550 parts of resorcinol were dissolved in 550 parts of water. 145 parts by weight of acetone and 94 parts by weight of 37% HCl were added to the solution. This mixture was allowed to stand at room temperature for 48 hours when a crystal slurry slowly separated off. The crystals were then sucked off and washed with distilled water and dried in vacuo at 70° C. The resulting product identified as 2,4,4-trimethyl-7,2′,4′-trihydroxyflavan was a white crystalline powder having a melting point of 225° C.

The above-described chroman derivatives are employed in the process of the invention in combination with a catalyst for the reaction between the chroman derivative and the polyepoxide. These materials are preferably alkaline or acidic materials. Examples of these include amines, their salts and quaternary ammonium salts. Preferred amines may be exemplified by the following: piperidine, p,p'-bis(dimethylaminophenyl) methane, pyridine, dimethyl aniline, benzyldimethylamine, triethanolamine, dimethylethanolamine, methyldiethanolamine, morpholine, dimethylaminopropylamine, dibutylaminopropylamine, stearyldimethylamine, tri-n-butylamine, N,N-dibutyl butylamine, phenylene diamine, diethylene triamine, hydrogenated phenylene diamines and the like, and mixtures thereof. The salts may be exemplified by the inorganic and organic acid salts of the amines, such as, for example, the hydrochloride, sulfate and acetate of each of the above-described amines. The quaternary ammonium salts may be exemplified by the following: benzyltrimethylammonium chloride, phenyltributylammonium chloride, cyclohexyltributylammonium sulfate, benzyltributylammonium sulfate, benzyltrimethylammonium borate, diphenyldioctylammonium chloride, and the like, and mixtures thereof.

Other catalysts include the phosphines, arsines, bismuthines and the like, such as triphenyl phosphine, tricyclohexylarsine, triphenylbismuthines and the like.

Still other catalysts include acids and acid anhydrides, such as sulfonic acids, phosphoric acids, dibutyl hydrogen phosphate, phthalic anhydride, pyromellitic anhydride, hexahydrophthalic anhydride, maleic anhydride and the like and mixtures thereof.

Preferred catalysts to be used are the hydrocarbon tertiary amines, and more preferably the mono- and diamines wherein the amine hydrogen have been replaced by aliphatic, cycloaliphatic or aromatic hydrocarbon radicals containing not more than 15 carbon atoms, such as, for example, trialkyl amines, triaryl amines, triarylalkylamines, alkyl arylalkylamines, tricycloalkylamines, alkyldicycloalkyl amines diaminoalkanes, dialkylene triamines, phenylene diamines and di(aminoaryl) alkanes. Also preferred are the hydrochloride, sulfate and acetate salts of the above-described amines. The preferred quaternary salts are those of the formula

wherein Y is nitrogen, R is an alkyl, aryl or arylalkyl radical, preferably containing no more than 12 carbon atoms and X is chloride.

According to the process of the invention, the cure is accomplished by admixing and heating the polyepoxide with the above-described chroman derivative and catalyst. The amount of the chroman derivative to be used in the process will vary within wide limits. Generally the chroman derivative is used in a quantity of 20 to 50 parts by weight per 100 parts by weight of polyepoxide. The quantity of the chroman derivative is smaller according as the epoxy content of the polyepoxide is lower.

As noted hereinafter, the process according to the invention is particularly suitable for curing epoxy resins having a relatively low molecular weight, e.g. less than 1,100, in particular less than 500. In curing such low molecular weight polyepoxides, the chroman derivative is preferably used in a quantity of 40–75 parts by weight per 100 parts by weight of polyepoxide.

The catalyst is needed only in small amounts. Excellent results are generally obtained when the catalyst is utilized in amounts varying from about 0.1% to about 3% by weight of the mixture, i.e. mixture of polyepoxide and chroman derivative, and more preferably in amounts varying from 0.1% to 2% by weight. If an amine is used as the catalyst, the quantity required is preferably not more than 1% by weight, in particular approximately 0.1% by weight calculated on the mixture of polyepoxide and chroman derivative.

If the chroman derivative is used in a quantity smaller than that mentioned above, a complete curing of the polyepoxide can nevertheless be obtained by using a greater quantity of catalyst than is necessary for the required acceleration of the reaction between the epoxy groups of the resin and the phenolic hydroxyl groups of the chroman derivative. In the latter case, the catalyst not only acts as a reaction accelerator, but also catalyzes the polymerization of the epoxy groups. In the cases, for example, the catalysts can be used in amounts say of the order of 4% to 30% by weight of the mixture of polyepoxide and chroman derivative.

With the use of the latter embodiments of the new process, the advantage is obtained, as compared to the known curing of epoxy resins using only amines (of which a still greater quantity is required), that the properties of the cured product obtained are better as regards chemical resistance and hardness (see Example III). As compared with the use of a greater quantity of the chroman derivative and a very small quantity (1% by weight or less) of catalyst as noted above, a lower pouring viscosity is obtained without the properties of the cured product being harmfully affected by using a smaller quantity of the chroman derivative and a quantity of catalyst which is greater than required to accelerate the reaction between the chroman derivative and the polyepoxide.

The temperature at which the cured reaction is carried out is usually less than 250° C. and is preferably 100–200° C. The duration of cure depends on the temperature applied as well as the nature of the catalyst used. Usually, the duration of cure lies between approximately 15 minutes and 48 hours, in particular between 1 and 24 hours.

The process according to the invention may, for example, be used in such a way that chroman derivatives which are generally immiscible with the polyepoxides at room temperature, are heated with these materials at a temperature exceeding 120° C., e.g. 180° C. for such a period that the product obtained is still fusible and soluble. At this temperature a homogeneous mixing is effected. On cooling to room temperature a solid product is formed which is still soluble in the solvents generally used for polyepoxides as noted below. The final curing of the precondensate of polyepoxide and the chroman derivative obtained by this method may be carried out by heating the solid precondensate thus formed to 100–200° C., e.g., approximately 130° C., and then adding a catalyst to the molten product obtained, and subsequently maintaining this temperature for several hours.

Examples of solvents that may be used in preparation of the new compositions if desired, include the volatile solvents that may escape from the composition, such as the ketones, like acetone, methyl ethyl ketone, methyl isobutyl ketone, isophorone, etc.; esters, such as ethyl acetate, butyl acetate, Cellosolve acetate, ethylene glycol monoacetate, methyl Cellosolve acetate; ether alcohols, such as methyl, ethyl or butyl ether of ethylene glycol or diethylene glycol; chlorinated hydrocarbons such as trichloropropane, chloroform, etc., ethers such as tetrahydrofuran and the like. These active solvents may be used in admixture with aromatic hydrocarbons, such as benzene, toluene, xylene and the like, and/or alcohols, such as ethyl, isopropyl or butyl alcohol. Other solvents include liquid monoepoxy compounds such as glycidyl allyl ether, glycidyl penyl ether, styrene oxide, cyano-substituted hydrocarbons, such as acetonitrile, propionitrile, adiponitrile, benzonitrile and the like.

Various other ingredients may be mixed with the polyepoxides to be cured with the phenols, such as pigments, fillers, dyes, plasticizers, other resins, and the like.

As noted above, the compositions of the invention may be heat-cured to form insoluble products which are very hard and have good resistance to heat and have excellent solvent resistance stability. The compositions of the invention may be used in a variety of applications, such as in the manufacture of adhesives, laminates and castings. When used as adhesives, they may be used in the bonding of a variety of material, such as metal-to-metal, wood-to-wood, glass-to-glass, glass-to-metal, metal-to-plastic and the like. They are of particular value, however, in the bonding of metals, such as aluminum-to-aluminum. When applied as an adhesive, the compositions may simply be spread on the desired surface to form films of various thicknesses, e.g. 5 mils to 30 mils and then the other surface superimposed and heat applied.

Another important application of the invention is the production of laminates or resinous articles reinforced with fibrous textile material. Although it is generally preferred to utilize glass cloth for this purpose, any of the other suitable fibrous materials in sheet form may be employed such as glass matting, paper, asbestos paper, mica flakes, cotton batts, duck muslin, canvas and the like.

In preparing the laminate, the sheets of fibrous material are first impregnated with compositions containing the polyepoxide, chroman derivative and catalyst. This is preferably accomplished by dissolving the chroman derivative and catalyst in a solvent such as acetone and then mixing the solution with the polyepoxide so as to obtain a fluid mixture. The sheets of fibrous material are impregnated with the mixture by spreading it thereon or by dipping or otherwise immersing them in the impregnant. The solvent is conveniently removed by evaporation and the mixture is cured to the fusible resin state. Although this operation may be conducted at room temperature (20° C. to 25° C.), it is preferred to use somewhat elevated temperature such as about 50° C. to 200° C. with the impregnated sheet stock passing through or hanging free in an oven or other suitable equipment. The resinification is arrested before infusible product occurs by cooling below about 40° C., preferably to about 20 to 25° C. A plurality of the impregnated sheets are then superposed and the assembly is cured in a heated press under a pressure of about 25 to 500 or more pounds per square inch. The resulting laminate is strong and has good resistance to loss of strength at elevated temperatures.

Still another application is the use of the compositions of the invention in preparing pottings and castings which are required to withstand elevated temperatures. This is generally accomplished by applying the compositions of the invention to the desired mold and then applying heat and pressure as desired to effect the necessary cure.

The polyepoxides to be cured by the process of the invention comprise those materials possessing more than one

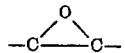

group. These compounds may be saturated or unsaturated, aliphatic, cycloaliphatic, aromatic or heterocyclic and may be substituted if desired with substituents, such as chlorine, hydroxyl group, ether radicals and the like. They may also be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

The process of the invention is particularly suitable for curing polyepoxides having a relatively low molecular weight, e.g. less than 1,100, and in particular less than 500. These low molecular weight polyepoxides have a relatively high epoxy content per unit of weight. Examples of these include the glycidyl polyethers of polyhydric phenols obtained by reacting epichlorohydrin with the polyhydric phenols in the presence of alkali, such as polyether A and polyether B described in U.S. 2,633,458, glycidyl ethers of polyhydric alcohols obtained by reacting the alcohol with epichlorohydrin and then dehydrochlorinating the resulting product, polyglycidyl ether of 1,1,2,2-tetrakis(4-hydroxyphenyl)ethane, (epoxy value of 0.45 eq./100 g. and melting point 85° C.), polyglycidyl ether of alpha,alpha,alpha',alpha'-tetrakis(hydroxyphenyl)-1,4-diethylbenzene (epoxy value 0.463 eq./100 g.), polyglycidyl ether of 1,1,5,5-tetrakis(hydroxyphenyl) pentane (epoxy value 0.514 eq./100 g.), and the like, and mixtures thereof.

The invention is illustrated by the following examples. Unless otherwise indicated, parts are parts by weight.

Polyether A used in the examples was obtained by reacting one mol of bis-phenol (2,2-bis(4-hydroxyphenyl) propane) with ten mols of epichlorohydrin in the presence of alkali. The resulting epoxy resin had a molecular weight of 370 and an average number of epoxy groups per molecule of 1.85.

Example I

A number of portions of polyether A were mixed at 180° C. with various quantities of 2,4,4-trimethyl-7,2',4'-trihydroxyflavan. The resultant products were cooled to room temperature and then heated to 140° C. for 24 hours in the presence of 0.5% by weight of various amine catalysts.

The cured products which were hard and flexible were examined in order to estimate what quantity of low molecular product could be isolated from a given quantity of finely powdered castings by extraction with boiling methyl ethyl ketone. The quantities of the components used, the type of catalyst and the results obtained are shown in the following table:

| Parts by weight of trihydroxyflavan to 100 parts of epoxy resin | Type and quantity (calculated on mixture of epoxy resin and trihydroxyflavan) of catalyst | Percent by weight of extractable low molecular products |
|---|---|---|
| 35 | 0.5% by weight of triethanolamine | 19.4 |
| 40 | do | 9.6 |
| 45 | do | 5.6 |
| 50 | do | 3.3 |
| 55 | do | 2.5 |
| 60 | do | 2.8 |
| 65 | do | 4.4 |
| 40 | 0.5% by weight of diethylene triamine | 8.2 |
| 45 | do | 3.4 |
| 50 | do | 2.5 |
| 55 | do | 2.1 |
| 60 | do | 2.3 |
| 40 | 0.5% by weight of piperidine | 7.8 |
| 45 | do | 2.6 |
| 50 | do | 1.1 |
| 55 | do | 1.1 |
| 60 | do | 1.2 |

Related results are obtained by replacing the 2,4,4-trimethyl-7,2',4'-trihydroxyflavan with equal amounts of each of the following: 2,4,4-trimethyl-5,7,2',4',6'-pentahydroxyflavan, 2,4-diethyl-4-methyl-7,2',4'-trihydroxyflavan, and 2,4,4-trimethyl-6,7,2',4',5'-pentahydroxyflavan.

Example II

Three portions of polyether A were separately mixed at a temperature of 180° C. with 55% by weight of 2,4,4-trimethyl-7,2',4'-trihydroxyflavan. After cooling to room temperature, triethanolamine, diethylene triamine and piperidine respectively were added at a temperature of 140° C. in a quantity of 0.5% by weight, calculated on the condensation product prepared, to the condensation product obtained. The compositions thus formed were cured by heating them to 140° C. The resulting products were very hard and flexible. The curing rate was ascertained by determining the percentage of low molecular extractable product described in Example I, at different curing times. The results are shown in the following table:

| Type of catalyst | Heating period (hours) | Extractable low molecular products (in percent by weight) |
|---|---|---|
| Triethanolamine | 4 | 7.7 |
| Do | 8 | 3.5 |
| Do | 16 | 2.1 |
| Do | 24 | 1.5 |
| Diethylene triamine | 4¾ | 6.1 |
| Do | 7½ | 4 |
| Do | 24 | 1.9 |
| Piperidine | 2 | 2.6 |
| Do | 4 | 1.8 |
| Do | 7¼ | 1.1 |
| Do | 24 | 1.1 |

This table shows clearly that the percentage of extractable product decreases with a longer heating period.

Related results are obtained by replacing polyether A in the above process with equal amounts of each of the following: polyglycidyl ether of 1,1,2,2-tetrakis(4-hydroxyphenyl) ethane, diglycidyl ether, diglycidyl ether of ethylene glycol, polyether B as described in U.S. 2,633,458 and diglycidyl ether of 2,2-bis(4-hydroxyphenyl) butane.

*Example III*

A number of properties were compared of three cured products obtained in various ways from polyether A.

The following table shows the conditions under which the three cured products were obtained.

| No. of the cured product | Amount of 2,4,4-trimethyl-7,2',4'-trihydroxyflavan in percent by weight | Type and quantity of amine [1] | Cure time in hours | Cure temperature in ° C. |
|---|---|---|---|---|
| 1 | 55 | 0.5% by weight of piperidine | 24 | 140 |
| 2 | | 6% by weight of piperidine | 24 | 100 |
| 3 | 30 | 3% by weight of piperidine | 24 | 140 |

[1] Calculated on the mixture of epoxy resin and trihydroxyflavan.

The above cured products were found to have the properties shown in the following table:

| No. of the cured product | Percent by weight of extractable low-molecular material | Hardness (Rockwell-E scale) | Heat distortion temperature, ° C.[1] | Dielectric constant— | Loss angle— |
|---|---|---|---|---|---|
| | | | | At 450 kilocycles per sec. 23° C., and a relative humidity of 50%. | |
| 1 | 1.1 | 63 | 133 | 4.0 | 0.21 |
| 2 | 0.4 | 50 | 90 | 3.8 | 0.020 |
| 3 | 0.8 | 60 | 129 | | |

[1] ASTM D648:18.5 kg./cm.²

Related results are also obtained by using as the catalyst 1% of each of the following: hydrogenated meta-phenylene diamine, triethylene tetramine, mixture of maleic anhydride and benzyl trimethylammonium chloride.

*Example IV*

100 parts of poly(allyl glycidyl) ether having a molecular weight of about 650 are combined with 50 parts of 2,4,4-trimethyl-7,2',4'-trihydroxyflavan and the mixture heated to 100° C. After cooling, 1% by weight of piperidine is added and the mixture heated at 140° C. The resulting product is a hard flexible coating having excellent solvent resistance.

The invention claimed is:

1. A process for curing a glycidyl polyether of the group consisting of glycidyl polyethers of polyhydric phenols and glycidyl polyethers of polyhydric alcohols, said glycidyl polyethers having a

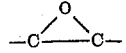

equivalency greater than 1.0 which comprises heating the glycidyl polyether with from 20 to 150 parts per 100 parts of glycidyl polyether of a polyalkylhydroxy-phenylchroman containing at least three phenolic OH groups per molecule in the presence of a catalyst for the reaction between the polyether and the chroman selected from the group consisting of alkaline and acidic catalysts.

2. A process for curing glycidyl polyethers of the group consisting of glycidyl polyethers of polyhydric phenols and glycidyl polyethers of polyhydric alcohols, said glycidyl polyethers having a

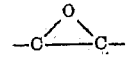

equivalency greater than 1.0 which comprises heating the glycidyl polyethers with from 20 to 150 parts per 100 parts of the glycidyl polyether of a polyalkylhydroxy-phenylchroman which contains at least three phenolic OH groups per molecule in the presence of a small amount of a catalyst comprising a member of the group consisting of alkaline and acidic materials.

3. A process as in claim 2 wherein the glycidyl polyether is a glycidyl polyether of a dihydric phenol which has a molecular weight less than 1,100.

4. A process as in claim 2 wherein the polyalkylhydroxy-phenylchroman is 2,4,4-trimethyl-7,2',4'-trihydroxyflavan.

5. A process as in claim 2 wherein the catalyst is an amine and is used in an amount less than 1% by weight.

6. A process for curing glycidyl polyether of a polyhydric phenol having a

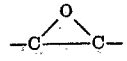

equivalency greater than 1.0 and a molecular weight less than about 1,100 which comprises heating at a temperature between 50° C. and 200° C. from 20 to 150 parts per 100 parts of the glycidyl polyether of a polyalkyl-hydroxy-phenylchroman having at least three phenolic OH groups in the presence of not more than 1% by weight of an amine.

7. A composition that may be cured to form very hard heat resistant products comprising a glycidyl polyether of the group consisting of glycidyl polyethers of polyhydric phenols and glycidyl polyethers of polyhydric alcohols, said glycidyl polyethers having a

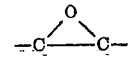

equivalency greater than 1.0 and a polyalkylhydroxy-phenylchroman containing at least three phenolic OH groups in the molecule.

8. A composition that may be cured to form very hard heat resistant products comprising a glycidyl polyether of a polyhydric phenol having a

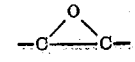

equivalency greater than 1.0 and 2,4,4-trimethyl-7,2',4'-trihydroxyflavan.

9. A process as in claim 6 wherein the polyalkylhydroxy-phenylchroman has the following formula

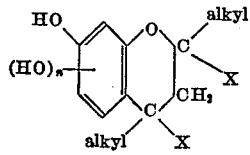

wherein one X is an alkyl radical and the other is a radical of the formula

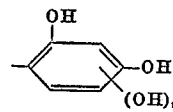

wherein in both formulas, $n$ is an integer from 0 to 1.

References Cited in the file of this patent

UNITED STATES PATENTS

| | | |
|---|---|---|
| 2,418,459 | Bousquet | Apr. 8, 1947 |
| 2,668,807 | Greenlee | Feb. 9, 1954 |